United States Patent [19]

Zhang et al.

[11] Patent Number: 5,164,856
[45] Date of Patent: Nov. 17, 1992

[54] TRANSMITTANCE-ADJUSTABLE WINDOW

[76] Inventors: Yongfeng Zhang; Zi-Ping Luo, both of 4066 E. Mission Blvd., Pomona, Calif. 91766

[21] Appl. No.: 656,695

[22] Filed: Feb. 19, 1991

[51] Int. Cl.⁵ .................. G02B 5/30; G02B 27/28; G02F 1/01
[52] U.S. Cl. .................. 359/489; 359/501; 359/593; 359/596
[58] Field of Search ............ 359/489, 501, 591, 592, 359/593, 594, 596

[56] References Cited

U.S. PATENT DOCUMENTS

| | | | |
|---|---|---|---|
| 3,504,962 | 4/1970 | Shanley | 359/593 |
| 3,528,722 | 9/1970 | Makas | 359/500 |
| 3,663,089 | 5/1972 | Makas | 350/147 |
| 4,123,141 | 10/1978 | Schuler | 350/159 |
| 4,285,577 | 8/1981 | Schuler | 350/403 |
| 4,364,375 | 12/1982 | Younghouse | 126/444 |
| 4,509,825 | 4/1985 | Otto et al. | 350/259 |
| 4,540,241 | 9/1985 | Rivier | 350/261 |
| 4,773,733 | 9/1988 | Murphy, Jr. et al. | 350/260 |
| 5,033,829 | 7/1991 | Faroughy | 350/396 |

Primary Examiner—Frank Gonzalez
Attorney, Agent, or Firm—Albert O. Cota

[57] ABSTRACT

A transmittance-adjustable window (20) that includes first and second polarizer sheets (34B)(46B) and an actuator (44) for relative movement between them. The first sheet (34B) has a translation direction Y and is formed from an alternating series of abutting, identically-shaped linear polarizer segments A and B distributed along translation direction Y. Each segment A has a first polarizing direction and each segment B has a second polarizing direction orthogonal to the first. The second sheet (46B) is substantially identical to the first sheet (34B) and positioned in an adjacent, substantially parallel plane. The actuator (44) moves one of the sheets with respect to the other between an OPEN alignment position and an OPAQUE alignment position. In the OPEN position, each segment of the first sheet superimposes a corresponding identical segment of the second sheet which allows light to pass. In the OPAQUE position, each segment of the first sheet superimposes a corresponding orthogonally polarized segment of the second sheet which prevents light from passing.

14 Claims, 5 Drawing Sheets

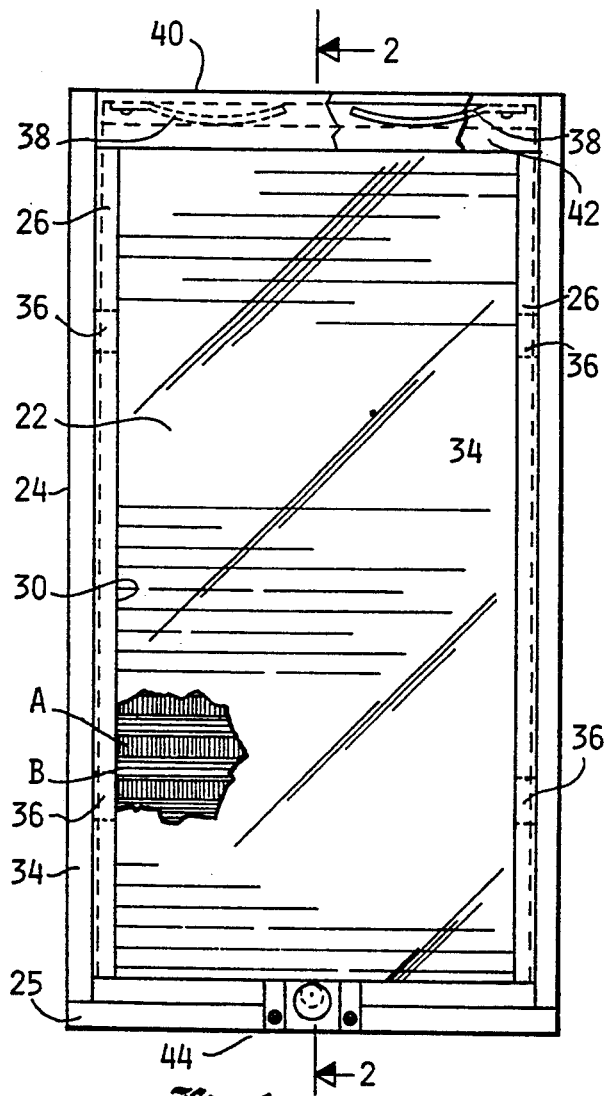
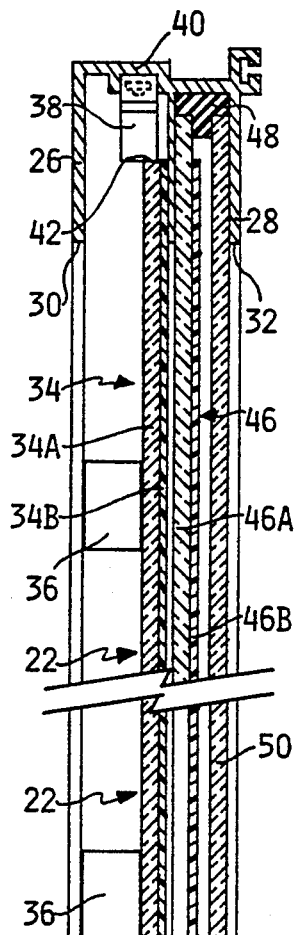
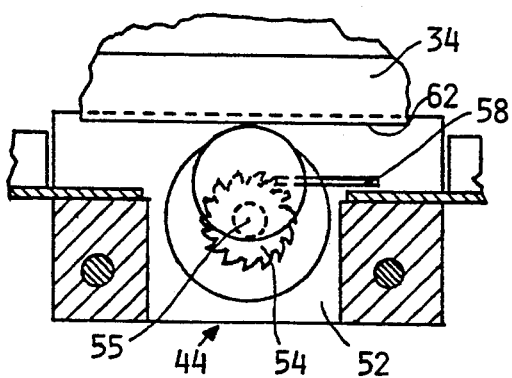
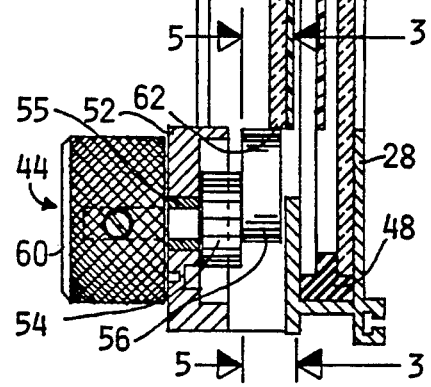
Fig.1.
Fig.2.
Fig.3.

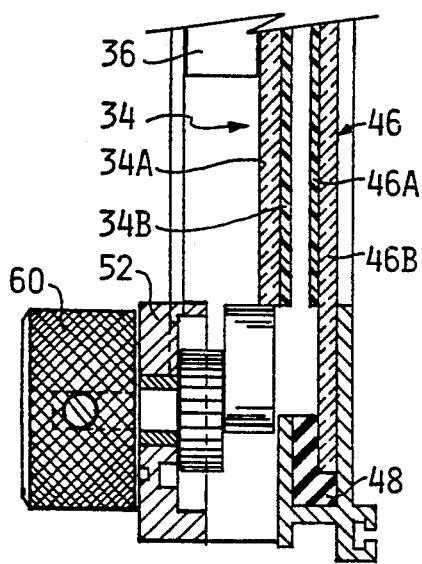
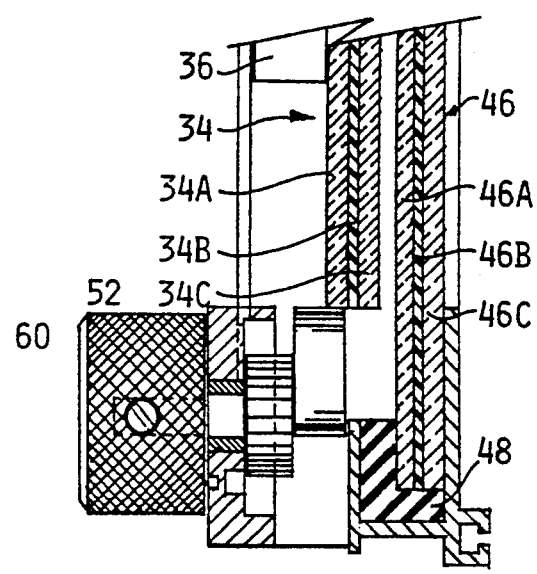
Fig.14.  Fig.15.
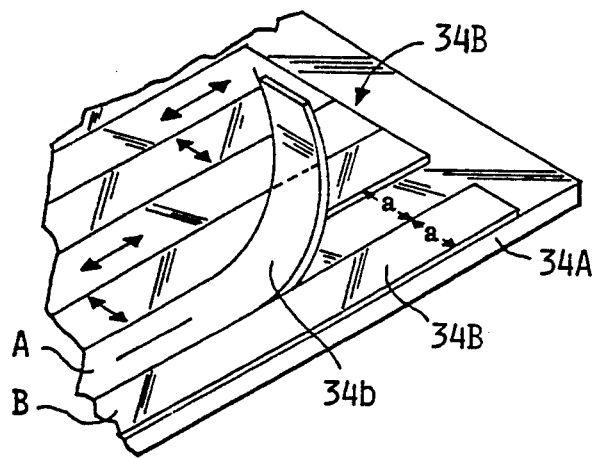
Fig.16.
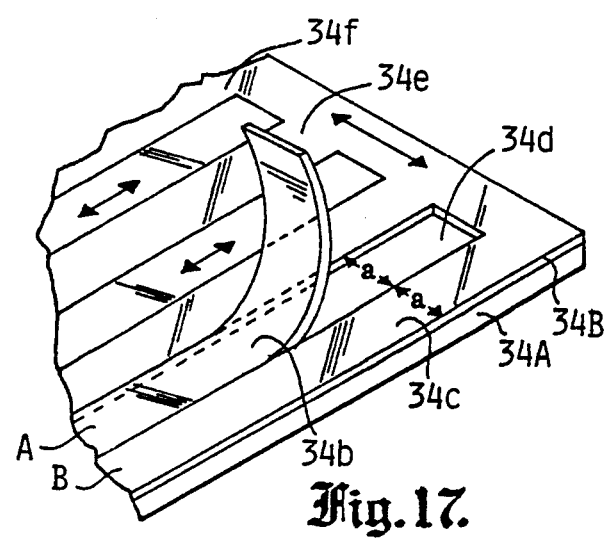
Fig.17.

TRANSMITTANCE-ADJUSTABLE WINDOW

TECHNICAL FIELD

The present invention relates to windows whose light transmittance can be adjusted by the user and more specifically to windows in which the light transmittance is controlled by use of segmented polarized sheets.

BACKGROUND ART

Where transparent wall or ceiling windows are employed, such as in buildings and vehicles, it is often desirable to adjust from time-to-time the amount of incident light transmitted through the window, either for privacy or to regulate interior brightness. Opaque or translucent shutters, shades screens, drapes and blinds are popular conventional ways of adjusting transmittance. However, such shutters have a number of problems and disadvantages. For example, shutter structures located external to the window pane collect dust and need periodic cleaning, have exposed gears, pulleys, and cords that occasionally jam and need repairs, and occupy considerable additional space compared to the window pane itself. Also, three dimensional opaque structures, even when only partially closed, may unduly interfere with the user's view through the window.

A search of the prior art did not disclose any patents that read directly on the claims of the instant invention however, the following U.S. patents were considered related:

| U.S. PAT. NO. | INVENTOR | ISSUED |
| --- | --- | --- |
| 4,773,733 | Murphy et al | 27 Sept 1988 |
| 4,540,241 | Rivier | 10 Sept 1985 |
| 4,509,825 | Otto et al | 9 Apr 1985 |
| 4,285,577 | Schuler | 25 Aug 1981 |
| 4,123,141 | Schuler | 31 Oct 1978 |
| 3,663,089 | Makas | 16 May 1972 |
| 3,528,722 | Makas | 15 Sept 1970 |
| 3,504,962 | Shanley | 7 Apr 1970 |

U.S. Pat. No. 4,773,733 (Murphy et al.) discloses a venetian blind having rotatable prismatic reflective slats so that direct rays of sunlight are excluded and indirect rays are admitted. However, this does not avoid the many general inconveniences of venetian blind structures. Another venetian blind structure, U.S. Pat. No. 4,509,825 (Otto et al.), in which the slats carry fresnel lens light reflective elements also has similar disadvantages.

A relatively compact light transmitting panel is disclosed in U.S. Pat. No. 4,540,241 (Rivier). This panel is a fixed assembly of transparent plates having inclined facets shaped and arranged so that incident solar radiation is refracted back toward the source or transmitted through the panel according to the angle of incidence. However, such a panel responds not to arbitrary adjustments made by the user, but only in a predetermined way to the angle of incident light.

A decorative type of compact window blind is shown in U.S. Pat. No. 3,504,962 (Shanley) in which a frame encloses two identical stationary light transmitting panels between which is a third, movable light transmitting panel. Each panel is arranged into a grid of alternating opaque and transparent rectangles. By moving the third panel between the first two, the user can achieve particular aesthetic effects, such as shading and coloring of the transmitted light or total opaqueness of the window. However, because of the checkerboard pattern of opaque and transparent rectangles, such a window cannot be made uniformly transparent.

It has been proposed in U.S. Pat. No. 3,528,722 (Makas) and 3,663,089 (Makas) to provide window structures that have two overlapping linear polarizer panes, one of which the user can rotate an arbitrary angle with respect to the other so that the light energy transmitted I obeys Malus' law $$I = I_{max} \cos^2 \theta \qquad \text{Eq. 1}$$

where $I_{max}$ is the maximum amount of light transmitted and I is the amount transmitted when the direction of one of the linear polarizers is at an angle $\theta$ with respect to the direction of polarization of the other. That is, when the directions of polarization of the two linear polarizers are aligned ($\theta = 0°$) the light transmitted $I = I_{max}$ is that which would be transmitted through either one of them alone. When the directions of polarization of the two linear polarizers are orthogonal to each other ($\theta = 90°$) no light (I=0) is transmitted.

Assuming the incident light is unpolarized, the maximum transmitted light $I_{max}$ will be 50 percent of the incident light since half of the incident unpolarized light can be considered as not transmitted because polarized orthogonal to the direction of linear polarization of the first-encountered polarizer. There are many uses of windows where this theoretical maximum of 50 percent transmission of the incident light can be tolerated to gain the advantages of a polarizer-based transmittance-adjusting mechanism, in which for unpolarized incident light the transmittance is adjustable between 0 and 50 percent.

For convenience, hereafter when we refer to two overlapping linear polarizers that are aligned so that the light energy transmitted $I = I_{max}$, we will say that the light transmitter they form is OPEN, even though its transmittance for unpolarized light is 50 percent. Note, that when two such overlapping polarizers are orthogonal to each other, the transmittance is 0, which means the light transmitter they form is OPAQUE.

Unfortunately, rotatable window structures as proposed in the Makas patents are useful in limited applications where windows of generally circular shape can be employed, such as in airplanes or ceiling windows. However, most windows are rectangular, in which case considerable extra space around the window would be required to accommodate rotation of at least one of the polarizer panes. In addition, in larger windows, such as in the sunroof of an automobile or in building windows, the power requirements for a rotatable window mechanism would be undesirably expensive.

Window structures that use polarizer panes without rotating them are shown in Schuler's U.S. Pat. Nos. 4,123,141 and 4,285,577. In these patents the window is divided into left and right halves and there is a movable half-window pane that carries at least a wave plate. The wave plate has a thickness selected to optically rotate the direction of polarization of incident light by 90°. When the movable half-window pane is in a first half of the window, due to crossed polarization in each half of the window, no light is transmitted and the window is OPAQUE. When the user moves the half-window pane to the second half of the window, due to polarization alignment in each half of the window, light is transmitted and the window is OPEN. In effect, moving the wave plate form one half of the window to the other causes virtual relative rotation of the polarizers.

However, such a structure has the disadvantage of depending on the wave plate which constitutes an additional element beyond the polarizers. It is also a disadvantage that the waveplate must travel a considerable distance (half the window width), since this requires a relatively large actuating mechanism. In addition, the thickness of the wave plate must be an odd one-half-wave multiple of the wavelength of the incident light. Therefore, it must be fabricated with considerable precision and will respond differently to light of different wavelengths.

In view of the problems associated with the prior art, there is a need for a window structure that enables a user to easily adjust the transmittance of a window from OPAQUE to OPEN, yet, does not need a wave plate to rotate the direction of polarization of transmitted light. Further, there is a need for such a window structure that only requires a short travel distance for its components.

DISCLOSURE OF THE INVENTION

In accordance with the invention, a transmittance-adjustable window has first and second optical sheets and an actuator for relative movement between them. The first sheet has a translation direction Y and is formed from an alternating series of abutting, identically-shaped linear polarizer segments A and B distributed along translation direction Y. Each segment A has a first polarizing direction and each segment B has a second polarizing direction orthogonal to the first.

The second sheet is substantially identical to the first sheet and positioned in an adjacent, substantially parallel plane. The actuator, such as a manually movable cam moves one of the sheets with respect to the other between an OPEN alignment position and an OPAQUE alignment position. In the OPEN position, each segment of the first sheet superimposes a corresponding identical segment of the second sheet. In the OPAQUE position, each segment of the first sheet superimposes a corresponding orthogonally polarized segment of the second sheet.

BRIEF DESCRIPTION OF THE DRAWINGS

FIG. 1 is a front elevational view of a transmittance-adjustable window unit embodying the invention.

FIG. 2 is a right cross-sectional view of the window unit of FIG. 1 taken along line 2—2 showing a window pane actuating mechanism in an OPEN position.

FIG. 3 is an enlarged internal view of a portion of the window unit of FIG. 2 along line 3—3 showing a window pane actuating mechanism in an OPEN position.

FIG. 14 is a bottom portion view of a modified transmittance-adjustable window unit embodying the invention, when the window pane actuating mechanism is in an OPEN position.

FIG. 15 is a bottom portion view of another modified transmittance-adjustable window unit embodying the invention, when the window pane actuating mechanism is in an OPEN position.

FIG. 16 shows a first method of making a light filter whose polarization alternates periodically between two orthogonal directions.

FIG. 17 shows a second method of making a light filter whose polarization alternates periodically between two orthogonal directions.

BEST MODE FOR CARRYING OUT THE INVENTION

Figure 4:
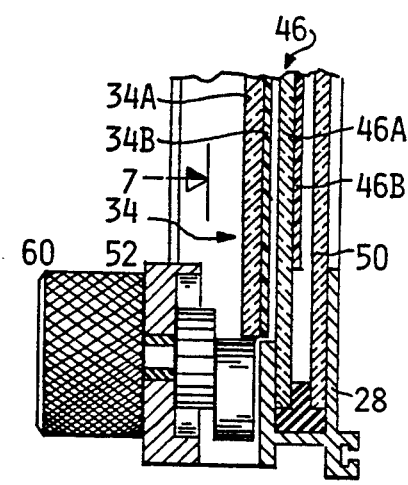
FIG. 4 is a bottom portion view of the window unit of FIG. 2 when the window pane actuating mechanism is in an OPAQUE position.

The best mode for carrying out the invention is presented in terms of a preferred embodiment that is designed to allow the transmittance-adjustable window to control the amount of incident light passing through the window.

The preferred embodiment of the transmittance-adjustable window 20, as shown in FIGS. 1 through 13 is comprised of the following major elements: a multi-layer pane assembly 22, consisting of a first periodic polarizer pane 34 that further consists of a transparent substrate 34A and a first linear polarizer sheet 34B; a second periodic polarizer pane 46 also consisting of a second transparent substrate 46A and a second linear polarizer sheet 46B; a multi-layer pane enclosure means 23 and a pane moving means 25.

In the design of the transmittance-adjustable window 20, the first pane 34 of the multi-layer pane 22 can be made movable and the second pane 46 stationary or the second pane 46 can be made to move while the first pane 34 remains stationary. However, for purpose of discussion the first pane 34 will be considered to be the movable pane and the second pane the stationary pane. Additionally, the multi-layer pane can be enclosed in various designs of a multi-layer pane enclosure 23 and operated by various pane moving means 25.

The invention is based on the phenomena that if two superimposed polarizer sheets are polarized in the same direction, say vertically, light will pass through the two sheets. However, if one of the superimposed sheets is polarized orthogonally to the other, that is horizontally, light will not pass. In view of this phenomena, the invention in its basic design configuration consists of a first linear polarizer sheet 34 and a second linear polarizer sheet 46 that is disposed for relative translation parallel to the first sheet. Both sheets are substantially identical with each sheet having a plurality of longitudinally abutting and alternating polarizing segments A and B, as shown in FIG. 1, where the polarized direction of segment A is orthogonal to the polarized direction of segment B.

When segments A and B on the first sheet are superimposed with corresponding identically polarized segments A or B on the second sheet on OPEN alignment is produced that allows light to pass through the two sheets. Conversely, when segments A and B on the first sheet are superimposed with corresponding orthogonally polarized segments B and A on the second sheet an OPAQUE alignment is produced that prevents light from passing through the two sheets.

In the preferred embodiment as shown in FIGS. 1 and 2, the transmittance-adjustable window 20 consists of a multi-layer pane assembly 22 that further consists of a first periodic polarizing pane 34 and a second periodic polarizing pane 46. The first pane consists of a transparent substrate 34A which may be made of either glass or plastic, and a first polarizer sheet 34B that is substantially the same size as the substrate and that is attached to the inward side, that is the side opposite the light entering side of the pane 22. The sheet 34B has a plurality of longitudinally abutting and alternating linear polarizing segments A and B, where the polarized direction of segment A is orthogonal to the polarized direction of segment B. Likewise, the second periodic polarizing pane 46 is substantially identical to the first pane 34 and includes a second transparent substrate 46A and a second linear polarizer 46B.

The two panes 34B, 46B are enclosed in a multi-layer pane assembly enclosing means 23 that includes a pane moving means 25 for allowing either the first or second pane to move parallel and relative to the other in a direction where:

when segments A and B on the first pane 34 are superimposed with the corresponding identically polarized segments A and B on the second pane 46 an OPEN alignment is produced that allows light to pass through the assembly 22, when segments A and B on the first panel 34 are superimposed with the corresponding orthogonally polarized segments A and B on the second pane 46 an OPAQUE alignment is produced that prevents light from passing through the assembly 22, and when segments A and B are positioned so that they overlap, that is, they are in-between the OPEN and OPAQUE positions, a SLATTED alignment is produced that allows some light to pass through the assembly 22.

As shown in FIG. 1, the transmittance-adjustable window 20 has the multi-layer pane 22 enclosed in a multi-layer pane enclosure means 23 which, in this case, is a window frame 24 of channel-like cross section. To allow for sliding insertion and removal of multi-layer pane 22, at least one of the sides of window frame 24, such as a bottom side 25, is attached to the other sides by removable fasteners, such as screws (not shown). To retain multi-layer pane 22, the front and back of frame 24 have peripheral lip portions 26, 28 which provide rectangular view openings 30, 32 that are slightly smaller than the height and width of multi-layer pane 22.

One of the layers of multi-layer pane 22, such as a front periodic polarizer pane 34, is adapted to slide vertically in window frame 24 during adjustments of transmittance. Here the terms vertical and horizontal are only used for convenience in reference to the drawings for any two directions that are orthogonal to each other.

To reduce friction between front pane 34 and frame lip portion 26, spacers 36 of a suitably smooth, durable material, such as low friction plastic, nylon or polytetrafluoroethylene (e.g., TEFLON polytetrafluoroethylene), can be attached as feet to front pane 34 by adhesive.

Front pane 34 is biased downward by a pair of spring arms 38 mounted in a top side 40 of window frame, which bear on the top edge 42 of pane 34. Front pane 34 is pushed upward against the spring bias by a manually adjustable actuating mechanism 44.

As shown in greater detail in FIG. 2, multi-layer pane 22 is of an adjustable sandwich construction made of at least two layers, a front periodic polarizer pane 34 and a back periodic polarizer pane 46. The front periodic polarizer pane 34 is a spacially periodic linear light polarizer and can be formed from a transparent substrate 34A made of glass or plastic. To this substrate, which is typically 0.325 to 0.125 inches (0.83 to 0.32 cm) thick, is attached a relatively thin linear polarizer sheet 34B which is typically 0.015 to 0.030 inches (0.038 to 0.077 cm) thick.

The back periodic polarizer pane 46 is also a spacially periodic linear light polarizer and can be similarly formed of a transparent substrate 46A made of glass or plastic, to which a thin polarizer sheet 46B is attached. With bottom side 25 attached, stationary pane 46 is kept snugly in place by suitable resilient spacers 48. Preferably window frame 24 is constructed to maintain a slight clearance or space 5 between panes 34 and 46 to reduce friction and wear.

Optionally, multi-layer pane 22 may also include a stationary rear pane 50 of transparent glass or plastic, typically 0.325 to 0.125 inches (0.83 to 0.32 cm) thick, also held in place by resilient spacers 48. If present, rear pane 50 merely protects the rear side of stationary pane 46 and provides additional insulation from temperature gradients, moisture, etc.

As seen in FIGS. 2, 3 and 4, the pane moving means 25 may consist of a manually adjustable actuating mechanism 44 that is formed of an actuator housing 52 in which a toothed gear 54 is rotatably mounted on a shaft 55 and carries an eccentric cylindrical cam surface 56. A resilient pawl 58 engages the teeth of gear 54 to form a ratchet, and a knob 60 is provided by which the user can turn gear 54 in only one direction (e.g., clockwise, as seen from the front in FIG. 1). By turning knob 60, the user can cyclically move cam surface 56 up and down a total distance a against a bottom edge 62 of downward-biased fron pane 34, which in turn translates pane 34 up as in FIG. 2 and down as in FIG. 4 a total distance a in each direction.

More generally, the actuator can be any convenient mechanism enabling the user to translate pane 34 up and down along a total distance a in each direction and hold the pane at any point along the way, such as a setscrew, a slider or plunger with a lock, etc.

Figure 5:
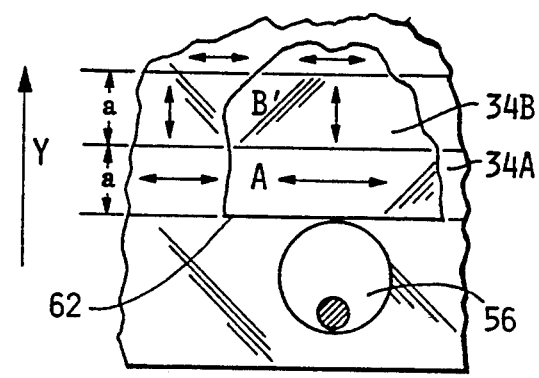
FIG. 5 is an enlarged partial internal view of the window unit of FIG. 2 along the line 5—5 showing a window pane actuating mechanism in an OPEN position.
Figure 6:
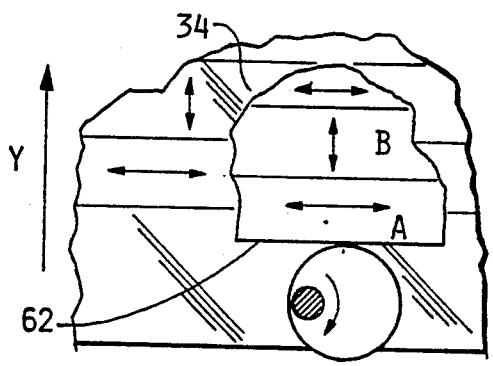
FIG. 6 is a view of the window unit of FIG. 4 with the window pane actuating mechanism is in an intermediate position.
Figure 7:
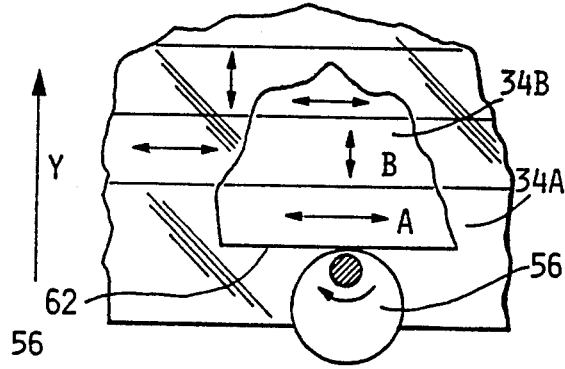
FIG. 7 is a view of the window unit of FIG. 5 with the window pane actuating mechanism in an OPAQUE position.

Front pane 34 has so far merely been described as a linear polarizer. As can be seen in FIGS. 5, 6 and 7, the orientation of pane 34's linear polarization (the preferred orientation for transmission of the light's electric field intensity E) as indicated by double-headed arrows alternates periodically in horizontal segments of width a in the vertical direction. For example, in FIG. 5 at the bottom of pane 34 there is a horizontal segment of width a in which the polarization is uniformly horizontal (A-type segment). Just above this is a horizontal segment of width a in which the polarization is uniformly vertical (B-type segment). And above this is a segment of width a in which the polarization is horizontal again (A-type segment), and so on, forming an alternating pattern (A, B, A, B, A . . . ) of linear polarization of spacial period $2a$.

While for simplification, the segments are illustratively shown as alternating between horizontal and vertical polarization, it is only necessary that every other segment have a first direction of linear polarization and the segments between them all have a second direction of linear polarization orthogonal to the first. For example, in FIG. 5, at the bottom of pane 34, the bottom segment could have a linear polarization of angle $\phi$ to the horizontal and the segment above it a linear polarization of $90-\phi$, etc.

Figure 8:
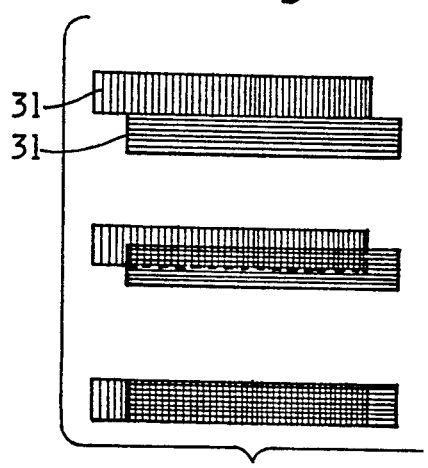
FIG. 8 shows from top to bottom, two segments of polarized material whose relative directions of polarization are orthogonal to each other in OPEN, SLATTED and OPAQUE positions.
Figure 9:
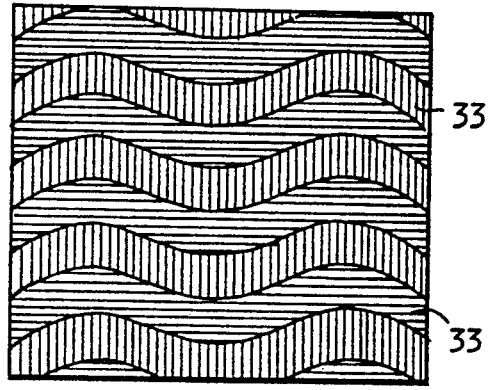
FIG. 9 is a plan view of a periodic polarizing structure consisting of wave-like segments.
Figure 10:
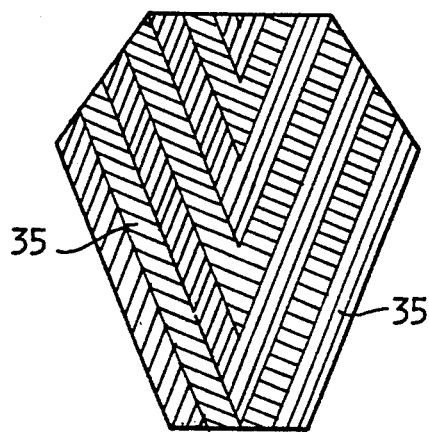
FIG. 10 is a plan view of a periodic polarizing structure consisting of pie-shaped segments.
Figure 11:
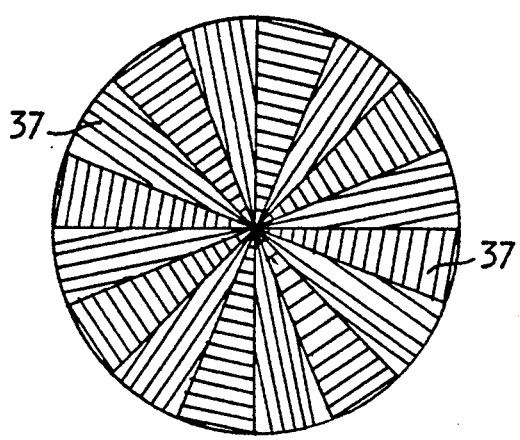
FIG. 11 is a plan view of a periodic polarizing structure consisting of vee-shaped segments.

More generally, front periodic polarizer pane or sheet 34 can be an alternating series of linear polarizer segments A and B which lie in a common plane and abut along their longitudinal edges. The segments A have a direction of polarization which is orthogonal to the direction of polarization of segments B. For simplicity, each of the segments A and B can have a common shape and be displaced from its neighbors by a simple translation along a common direction Y in the plane common to all the segments. For example, in addition to having rectangular segments 31 as shown in FIG. 8, the periodic polarizing structure may consist of wave-like segments 33 as shown in FIG. 9; vee-shaped segments 35 as shown in FIG. 10; or pie-shaped segments 37 as shown in FIG. 11. The windows using the pie-shaped segments would require that one of the sheets provide a radial translation with respect to the other.

As shown in FIGS. 5, 6 and 7, stationary linear polarizer pane 46 also has alternating segments of linear polarization of width a that follow the same periodically alternating pattern as found in movable front pane 34. In FIG. 5 cam 56 is at its uppermost position and the polarization patterns of the two sheets align exactly. In such a case, there will be maximum transmission of the incident light, and the window can be considered OPEN to light.

Therefore, in FIG. 5, the window would appear to the user to be made up of a series of segments of width a, each of which is OPEN. This OPEN condition differs form a 100 percent transparent window in two respects. As previously explained, because of polarization of the incident unpolarized light, the OPEN transmittance cannot exceed a theoretical maximum of 50 percent.

On each sheet where the polarization abruptly changes orientation is located a boundary line. On a full pane, these boundary lines form a series of horizontal lines space a distance a apart. A noticeable boundary line where the polarization changes is considered generally undesirable. Therefore, its appearance is minimized by use of thin polarizer material and precision in the shape and alignment of the series of horizontal segments of width forming each of periodic linear polarizer panes 34 and 46. Methods of forming panes 34 and 46 will be discussed further below.

In FIG. 6 cam 56 is at a position which is midway between its uppermost and lowest positions and front pane 34 has moved down a distance $a/2$ from its position in FIG. 4. The polarization patterns of the two sheets are no longer exactly aligned. Instead they are in alignment for the bottom half width of each segment of stationary linear polarizer pane 46 and orthogonal to each other for the top half width of each segment of pane 46. Therefore, in FIG. 6 the window would appear to the user to be made up of a series of segments of width $a/2$ alternating between OPEN and OPAQUE; we call this the SLATTED condition.

In FIG. 7 cam 56 is at its lowest position and front pane 34 has moved down a distance a from its position in FIG. 4. The polarization patterns of the two sheets are completely orthogonal to each other. Therefore, in FIG. 7, the window would appear to the user to be completely OPAQUE.

In this way by merely turning actuator knob 60, the user can cycle the window through its major states of OPEN, SLATTED, and OPAQUE. Moreover, there is acutally a continuum of intermediate states between OPEN and OPAQUE. The segments are separated at their centers by a vertical distance being of minimal width in the OPEN state and gradually becoming wider and wider as one progresses from OPEN to SLATTED to OPAQUE.

More generally, if front and back panes or sheets 34 and 46 are each a periodic linear polarizer sheet of alternating linear polarizer segments A and B, they can be overlaid in an OPEN alignment position in which each segment (A, B) of sheet 34 is superimposed by a corresponding identically polarized segment (A, B) of sheet 46. Because of the spacially periodic structure of each pane 34, 46, a relative translation of one with respect to the other over a distance on the order of a, the segment width, can provide an OPAQUE alignment. In the OPAQUE alignment each segment (A, B) of sheet 34 is superimposed by a corresponding orthogonally polarized segment (A, B) of sheet 46. Moreover, as panes 34, 46 are translated relative to each other between the OPEN and OPAQUE alignments, the intermediate positions will have the SLATTED alignments previously described.

As described above, for simplicity in each pane or sheet 34, 46 the segments A and B can have a common shape and be displaced from its neighbors by a simple translation along a common direction Y in a plane common to all the segments. In such case, the relative translation between sheets 34 and 46 that moves them between the OPEN and OPAQUE alignments can also be in the Y direction.

For simplicity, in the illustrated embodiments, the common translation direction Y is shown as only having a component transverse to the segments, but more generally Y could also have a component in a longitudinal direction of the segment. In such a case, translating one of the segments in the Y direction would sweep out a parallelogram not having right angles instead of a simple rectangle. Such an orientation for Y might be appropriate for designs where panes or sheets 34, 46 should be non-right-angle parallelograms, for example to accommodate a similarly shaped window frame.

FIG. 8 shows, from top to bottom, two rectangular segments 31 of polarized material whose relative directions of polarization are orthogonal to each other, in OPEN, SLATTED and OPAQUE positions. The main or middle portions of the segments overlap, but the ends do not. This illustrates that in FIG. 1 if desired, sheets 34 and 46 can have slightly non-overlapping lateral edges as long as the main or middle portions appearing to the user in front and rear rectangular view openings 30, 32 are overlapping.

Figure 12:
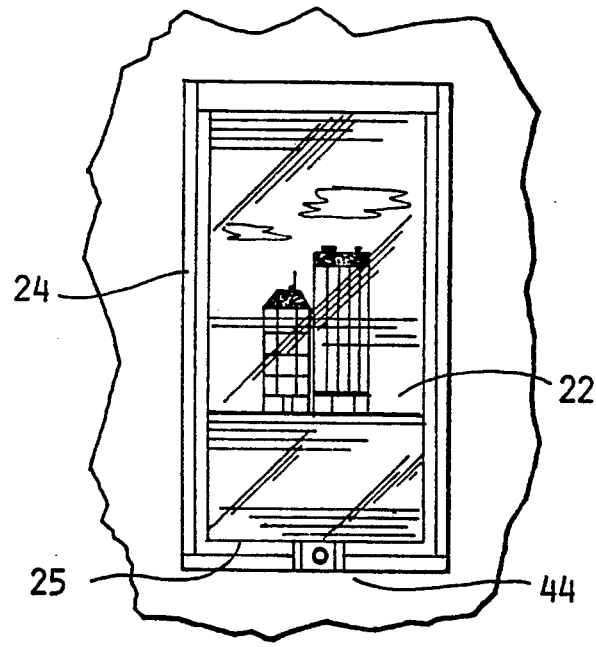
FIG. 12 is a front elevational view of a transmittance-adjustable window unit embodying the invention made of panes of material whose polarization alternates periodically in the vertical direction as seen when the window unit is OPEN.
Figure 13:
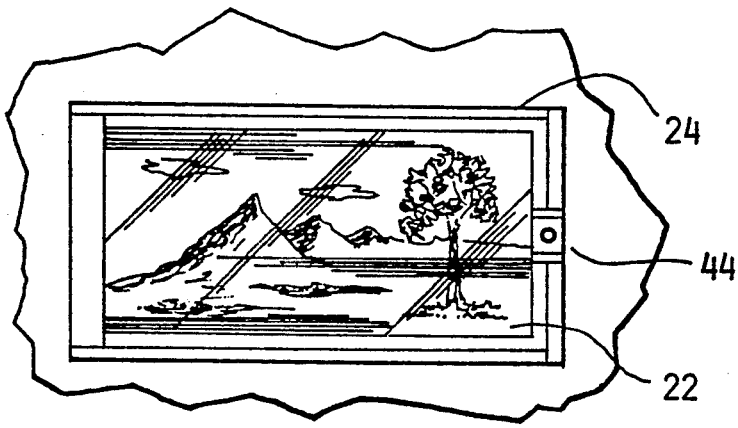
FIG. 13 is a front elevational view of a transmittance-adjustable window unit embodying the invention made of panes of material whose polarization alternates periodically in the horizontal direction as seen when the window unit is OPEN.

In FIGS. 1 and 12, the longitudinal direction of the segments is parallel to the bottom side 25 of frame 24. In FIG. 13, the segments' longitudinal direction is parallel to the frame's lateral sides. More generally the segments' longitudinal direction is oblique with respect to the side of the window frame, in this case front pane 34 would have to move in a translation direction Y not parallel to the sides of frame 24.

In FIG. 14 is shown a modification of the multi-layer pane 22 in which a sandwich of just two panes offers improved protection for the delicate polarizing sheets 34B and 46B respectively affixed to transparent substrates 34A and 46A. In this design, polarizing sheets 34B and 46B face each other on the inside of the sandwich, and transparent substrates 34A and 46A respectively provide sturdy protective outer front and back walls for multi-layer sandwich pane 22. Therefore, there is no need for an additional transparent pane, such as rear pane 50 of FIGS. 2 and 4, to guard the delicate polarizing sheets.

In FIG. 15 is shown a third modification of the multi-layer pane 22 in which each periodic polarizer pane 34, 46 respectively is a sandwich consisting of a protective transparent front substrates 34A, 46A and rear 34C, 46C substrates which enclose a delicate polarizer sheet 34B, 46B. This enables individual panes 34, 46 to be easily handled for assembly and repair of the window unit.

For any of these modifications only two segments are required to practice the invention. However, the segment width a is preferably chosen so that the window pane is divided into at least 10 segments of equal width, and often finer divisions of the window into 20, 30 or more segments are even more preferable. As dimension a determines the amount of relative travel of the panels, it should be kept small so the additional space needed in frame 24 to accommodate the travel is small.

In practice, the size and shape of the segments a will depend on the user's personal preference and aesthetic judgement, etc., as well as the size of window frame 24. For example, if window frame 24 of FIG. 1 is about 46 inches (117.9 cm) high and 28 inches (71.8 cm) wide and to be used as an external window in a residence, a segment width a of between 0.3 and 2 inches (0.8 to 5 cm) or less would be acceptable to many users.

It is a feature of the invention that the pane that is moved will only traverse a distance a, which will generally be a small fraction of the window's overall dimension in the direction of travel. Therefore, only a relatively small additional space is required in window frame 24 in the dimension corresponding to the direction of travel to accommodate this limited travel distance a.

Generally a window according to the invention will appear to have less noticeable distortion when OPEN if the segments of alternating linear polarization are horizontal as shown in FIG. 9, perhaps because human eyes are more likely to "sweep" in a scene horizontally than vertically. Nevertheless, the invention can be usefully practiced with the alternating segments vertically oriented as shown in FIG. 13, in which case the actuator will move pane 34 a distance a horizontally rather than vertically.

The invention also includes methods for making periodic polarizer panes 34 and 46 so they have segments of periodically alternating linear polarization.

As shown in FIGS. 2 and 16, front polarizer pane 34 can be formed from a transparent glass or plastic substrate 34A, typically 0.325 to 0.125 inches (0.083 to 0.32 cm) thick, to which the polarizer sheet 34B is attached. Polarizer sheet 34B can be formed of a series of relatively thin segments 34b of polarizer material having a thickness of between 0.015 to 0.030 inches (0.038 to 0.077 cm) segment width a, each attached to substrate 34A by a sufficient amount of transparent adhesive or some other convenient means.

The ends of segments 34b can be located under front and back lip portions 26, 28 of window frame 24 so the segment ends will not be visible to the user. However, for durability it may be necessary to apply transparent adhesive to non-end portions of segments 34b not concealed by lip portions 26, 28, so the segments will lie snugly in alignment against substrate 34A and not be easily moved or dislodged during assembly or repair of the window unit.

Segments 34b can be made of polarizer material cut in opposing directions form an H-sheet linear polarizer sheet, a commercially available product. H-sheet polarizer is made of aligned long chain polymers laminated in a suitable durable transparent material, such as cellulose acetobutyrate (CAB). Polarizer pane 46 can be formed in a similar manner.

An example of a suitable, commercially available H-sheet is IP38SG linear polarizer available in 14×24×0.030 inch (36×62×0.077 cm) sheets from International Polarizer, Inc. These sheets, which are neutral gray in color, have a 38 percent transmittance for unpolarized light, which is a good approximation of the theoretical maximum of 50 percent. In the visible spectrum, two sheets crossed cause an average transmittance of incident light of 0.04 percent, which produces a good OPAQUE effect.

FIG. 17 shows another method of forming polarizer sheet 34B and polarizer pane 34, which method can also be used in forming polarizer pane 46. A transparent glass or plastic substrate 34A is provided, typically 0.325 to 0.125 inches (0.83 to 0.32 cm) thick, to which thin polarizer sheet 34B is to be attached. Linear polarizer sheet 34B is formed of a polarizer template 34c into which segments 34b are inserted. Template 34c has cutout slots 34d of width a alternating with uncut segment portions 34e of width a. Template 34c is cut from thin polarizer material, such as an H-sheet linear polarizer of about 0.015 to 0.30 inches (0.038 to 0.077 cm) thickness. A narrow margin 34f left at each lateral edge of the sheet will be hidden by the frame's peripheral lip portions 26, 28. Template 34c is a sounder structure for making and aligning the spaced segment portions 34e than if they were arranged together from individual segments. Template 34c can be easily attached as a unit to a face of substrate 34A, by transparent adhesive or some other convenient means.

Segments 34b of width a and sized to fit snugly in slots 34d are cut with an opposed polarization orientation from the same or a similar thin H-sheet linear polarizer. Segments 34b are inserted snugly into slots 34d of template 34c and attached just at their ends to the face of substrate 34A by a small amount of transparent adhesive or some other convenient means. Moreover, by locating the ends of the segments under front and back lip portions 26, 28 of window frame 24, the segment ends and any adhesive will not be visible to the user. This forms a relatively durable structure for pane 34 having the desired periodically alternating polarization characteristic.

By comparison, if the "all segment" method of FIG. 16 is used to make polarizer sheet 34B, it may be necessary to affix more than just the ends of the segments to transparent substrate 34A so the segments will lie snugly in alignment against the substrate and not be damaged during assembly or repair of the window unit.

Other ways of making panes 34 and 46 will be readily apparent to those skilled in the art of making polarizers. For example, there is a type of polarizer called a variable-axis-direction polarizer, which is a side-by-side arrangement or mosaic of elements, each of which is a linear polarizer and has a different orientation. Panes 34 and 46 could be a direct product of such variable-axis-polarizer.

In general, the polarizer sheets 34B, 46B are substantially rectangular and of dimension H in a first direction and of an equal, smaller or greater dimension L in a second direction. Each polarizer segment A and B has a width that lies between H/2 to H/n, where n may be any integer such as 10, 20 or 30. The segments are in a transverse direction substantially parallel to the first direction and a length approximately L in a longitudinal direction substantially parallel to the second direction.

Figure 18:
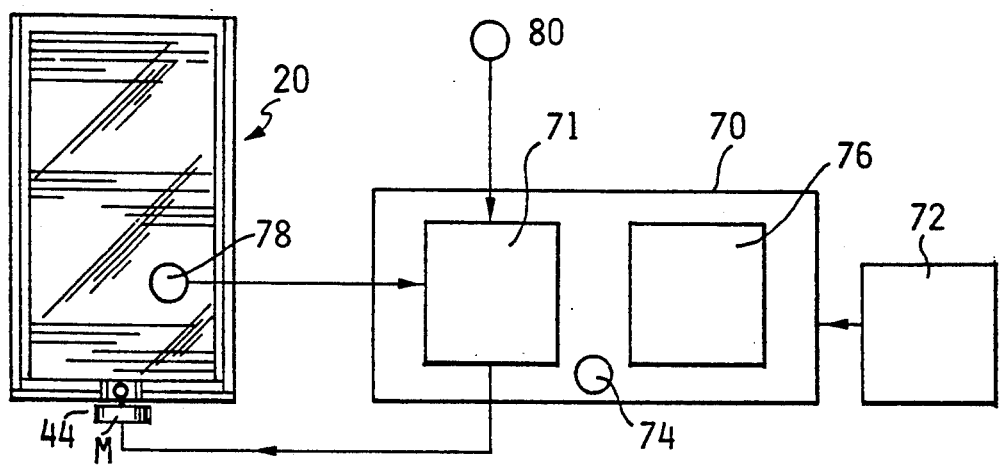
FIG. 18 is a partial block diagram of a transmittance-adjustable window that is operated by means of an automatic controller.

As shown in FIG. 18, a transmittance-adjustable window can be made to operate automatically by an electromechanical circuit 70 that provides a motor, solenoid, or other electromechanical driver M for the actuating mechanism 44. Driver M is turned on and off by a control circuit 71 which is powered by a power supply 72. A switch 74 on the controller circuit is used to turn the control circuit ON and OFF. Control circuit 70 includes a timer/clock circuit 76 so that motor M can be actuated at preselected times, or the control circuit itself turned on, at times or for intervals preselected by the user. The control circuit can also be provided with internal and external light intensity sensors 78, 80, so that actuation of the motor M depends on the incident or interior light intensity, or their difference.

For example, if window 20 is used in a parked vehicle, control circuit 71 can be set to automatically make the window OPAQUE on hot sunny days. Or when the vehicle is being driven, control circuit 70 can be set to automatically maintain the interior light level within a desired range.

Figure 19:
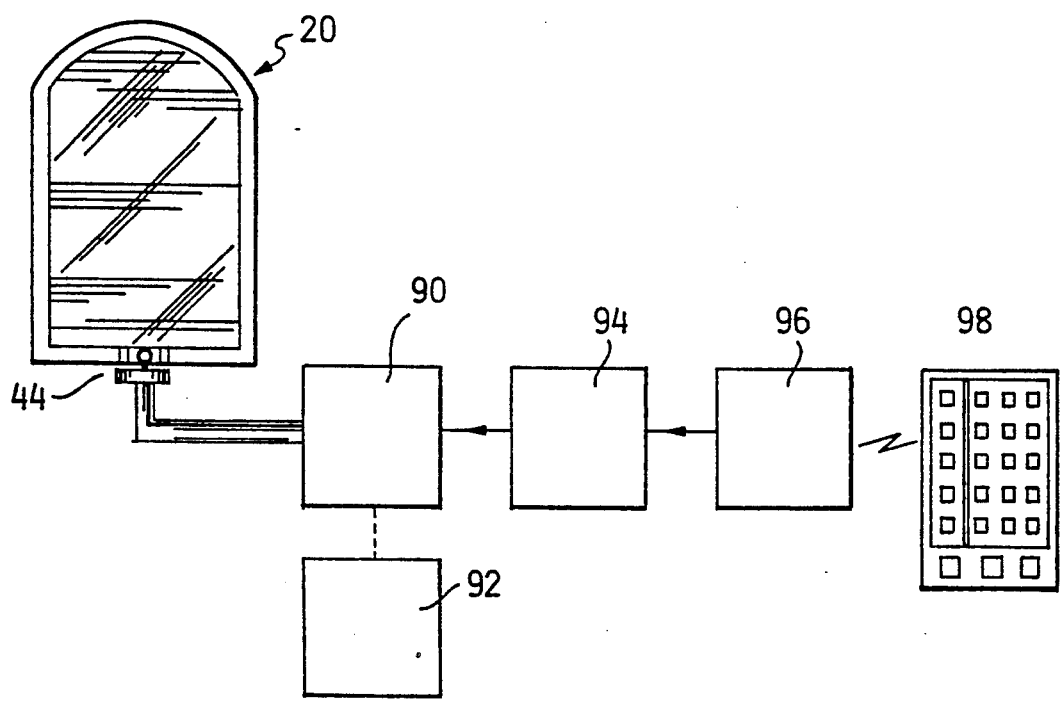
FIG. 19 is a partial block diagram of a transmittance-adjustable window that is operated by means of an infrared receiver and infrared transmitter, when the transmitter can be a conventional television infrared remote control unit.

Another method to control the operation of the actuating mechanism 44 is by the electromechanical circuit shown in FIG. 19. This circuit employs a reversible motor 90 or incremental stepping motor 92 that is attached directly to the actuating mechanism 44. A power source 94 that is connected directly to the motor 90 or 92 is activated by an infrared receiver 96 that, in turn, is energized by an infrared transmitter 98. The transmitter can be one of the many infrared television remote control units in current use. Any button on the unit can be pressed to produce the required infrared signal.

While the invention has been described in complete detail and pictorially shown in the accompanying drawings it is not to be limited to such details, since many changes and modifications may be made to the invention without departing from the spirit and the scope thereof. For example, the pane moving means 25 can consist of a combination worm gear and worm, where the worm is driven by a lever that is connected to the edge of the movable periodic polarizing pane 34. Hence, it is described to cover any and all modifications and forms which may come within the language and scope of the claims.

We claim:

1. A transmittance-adjustable window comprising:
   A. a multi-layer pane assembly comprising:
      a) a first periodic polarizing pane consisting of:
         (1) a first transparent substrate,
         (2) a first linear polarizer sheet being of substantially the same size as said first transparent substrate and attached to the inward side of said substrate, said sheet having a plurality of longitudinally abutting and alternating linear polarizing segments A and B, that lie in a common plane and are configured in a vee-shape where the polarized direction of segments A is orthogonal to the polarized direction of segments B,
      b) a second periodic polarizing pane substantially identical to said first periodic polarizing pane, having a second transparent substrate and a second linear polarizer sheet,
   B. means for enclosing said multi-layer pane assembly,
   C. means for allowing said first or second pane to move parallel and relative to the other in a direction where:
      a) when segments A and B on said first pane are superimposed with corresponding identically polarized segments A and B on said second pane on OPEN alignment is produced that allows light to pass through said assembly,
      b) when segments A and B on said first pane are superimposed with corresponding orthogonally polarized segments B and A on said second pane an OPAQUE alignment is produced that prevents light from passing through said assembly, and
      c) when segments A and B are placed in an overlapping position between the OPEN and OPAQUE positions, a slatted alignment is produced that allows some light to pass through said assembly.

2. A transmittance-adjustable window comprising:
   A. a multi-layer pane assembly comprising:
      a) a first periodic polarizing pane consisting of:
         (1) a first transparent substrate,
         (2) a first linear polarizer sheet being of substantially the same size as said first transparent substrate and attached to the inward side of said substrate, said sheet having a plurality of longitudinally abutting and alternating linear polarizing segments A and B that are configured in a pie-shape with said first and second linear polarizer sheets being in a circular shape where one of said sheets is disposed to provide a radial translation with respect to the other sheet where the polarized direction of segments A is orthogonal to the polarized direction of segments B,
      b) a second periodic polarizing pane substantially identical to said first periodic polarizing pane, having a second transparent substrate and a second linear polarizer sheet, B. means for enclosing said multi-layer pane assembly, C. means for allowing said first or second pane to move parallel and relative to the other in a direction where:
- a) when segments A and B on said first pane are superimposed with corresponding identically polarized segments A and B on said second pane an OPEN alignment is produced that allows light to pass through said assembly,
- b) when segments A and B on said first pane are superimposed with corresponding orthogonally polarized segments B and A on said second pane an OPAQUE alignment is produced that prevents light from passing through said assembly, and
- c) when segments A and B are placed in an overlapping position between the OPEN and OPAQUE positions, a SLATTED alignment is produced that allows some light to pass through said assembly.

3. A transmittance-adjustable window comprising:
- a) a first periodic polarizing pane consisting of:
  - (1) a parallel pair of protective transparent substrates,
  - (2) a first linear polarizer sheet being of substantially the same size as said substrates and where said sheet is sandwiched between said pair of protective transparent substrates, said sheet having a plurality of longitudinally abutting and alternating linear polarizing segments A and B, where the polarized direction of segments A is orthogonal to the polarized direction of segment b,
- b) a second periodic polarizing pane substantially identical to said first periodic polarizing pane, B. means for enclosing said multi-layer pane assembly, C. means for allowing said first or second pane to move parallel and relative to the other in a direction where:
- a) when segments A and B on said first pane are superimposed with corresponding identically polarized segments A and B on said second pane an OPEN alignment is produced that allows light to pass through said assembly,
- b) when segments A and B on said first pane are superimposed with corresponding orthogonally polarized segments B and A on said second pane an OPAQUE alignment is produced that prevents light from passing through said assembly, and
- c) when segments A and B are placed in an overlapping position between the OPEN and OPAQUE positions, a SLATTED alignment is produced that allows some light to pass through said assembly, 4. A transmittance-adjustable window comprising:
A. a multi-layer pane assembly comprising:
- a) a first periodic polarizing pane consisting of:
  - (1) a first transparent substrate,
  - (2) a first linear polarizer sheet being of substantially the same size as said, first transparent substrate and attached to the inward side of said substrate, said sheet having a plurality of longitudinally abutting and alternating linear polarizing segments A and B, where the polarized direction of segments A is orthogonal to the polarized direction of segments B,
- b) a second periodic polarizing pane substantially identical to said first periodic polarizing pane, having a second transparent substrate and a second linear polarizer sheet, B. means for enclosing said multi-layer pane assembly, C. means for allowing said first or second pane to move parallel and relative to the other in a direction where said means comprises an actuator coupled to said second periodic polarizer sheet to translate it between the OPEN and OPAQUE alignment positions, or to a SLATTED position that lies between the CLOSED and OPAQUE positions, said actuator further comprising:
- a) a rotatable shaft,
- b) a spring that bias said second periodic polarizer sheet in the OPAQUE alignment position,
- c) a spring that bias said second periodic polarizer sheet in the CLOSED alignment position, and
- d) a ratchet for constraining the rotatable shaft to turn in only one direction where
  - (1) when segments A and B on said first pane are superimposed with corresponding identically polarized segments A and B on said second pane an OPEN alignment is produced that allows light to pass through said assembly,
  - (2) when segments A and B on said first pane are superimposed with corresponding orthogonally polarized segments B and A on said second pane an OPAQUE alignment is produced that prevents light from passing through said assembly, and
  - (3) when segments A and B are placed in an overlapping position between the OPEN and OPAQUE positions, a SLATTED alignment is produced that allows some light to pass through said assembly, 5. A transmittance-adjustable window comprising:
A. a multi-layer pane assembly comprising:
- a) a first periodic polarizing pane consisting of:
  - (1) a first transparent substrate,
  - (2) a first linear polarizer sheet being of substantially the same size as said first transparent substrate and attached to the inward side of said substrate, said sheet having a plurality of longitudinally abutting and alternating linear polarizing segments A and B, where the polarized direction of segments A is orthogonal to the polarized direction of segments b,
- b) a second periodic polarizing pane substantially identical to said first periodic polarizing pane, having a second transparent substrate and a second linear polarizer sheet, B. means for enclosing said multi-layer pane assembly, C. means for allowing said first or second pane to move parallel and relative to the other in a direction where said means comprises an actuator coupled to said second periodic polarizer sheet to translate it between the OPEN and OPAQUE alignment positions, or to a SLATTED position that lies between the CLOSED and OPAQUE positions, said actuator, further comprising:
- a) an electromechanical circuit that controls the operation of said actuator,
- b) a rotatable shaft, c) a spring that bias said second periodic polarizer sheet in the OPAQUE alignment position,
d) a spring that bias said second periodic polarizer sheet in the CLOSED alignment position, and
e) a ratchet for constraining the rotatable shaft to turn in only one direction where
  (1) when segments A and B on said first pane are superimposed with corresponding identically polarized segments A and B on said second pane an OPEN alignment is produced that allows light to pass through said assembly,
  (2) when segments A and B on said first pane are superimposed with corresponding orthogonally polarized segments B and A on said second pane an OPAQUE alignment is produced that prevents light from passing through said assembly, and
  (3) when segments A and B are placed in an overlapping position between the OPEN and OPAQUE positions, a SLATTED alignment is produced that allows some light to pass through said assembly, 6. A transmittance-adjustable window comprising:
A. a multi-layer pane assembly comprising:
  a) a first periodic polarizing pane consisting of:
    (1) a first transparent substrate,
    (2) a first linear polarizer sheet being of substantially the same size as said first transparent substrate and attached to the inward side of said substrate, said sheet having a plurality of longitudinally abutting and alternating linear polarizing segments A and B, where the polarized direction of segments A is orthogonal to the polarized direction of segments B,
  b) a second periodic polarizing pane substantially identical to said first periodic polarizing pane, having a second transparent substrate and a second linear polarizer sheet,
B. means for enclosing said multi-layer pane assembly,
C. means for allowing said first or second pane to move parallel and relative to the other in a direction where said means comprises an actuator coupled to said second periodic polarizer sheet to translate it between the OPEN and OPAQUE alignment positions, or to a SLATTED position that lies between the CLOSED and OPAQUE positions, said actuator further comprising:
  a) an electromechanical circuit having a light intensity sensor that allows said circuit to be responsive to said sensor to control the operation of said actuator,
  b) a rotatable shaft,
  c) a spring that bias said second periodic polarizer sheet in the OPAQUE alignment position,
  d) a spring that bias said second periodic polarizer sheet in the CLOSED alignment position, and
  e) a ratchet for constraining the rotatable shaft to turn in only one direction where
    (1) when segments A and B on said first pane are superimposed with corresponding identically polarized segments A and B on said second pane an OPEN alignment is produced that allows light to pass through said assembly,
    (2) when segments A and B on said first pane are superimposed with corresponding orthogonally polarized segments B and A on said second pane an OPAQUE alignment is produced that prevents light from passing through said assembly, and
    (3) when segments A and B are placed in an overlapping position between the OPEN and OPAQUE positions, a SLATTED alignment is produced that allows some light to pass through said assembly.

7. A transmittance-adjustable window comprising:
A. a multi-layer pane assembly comprising:
  a) a first periodic polarizing pane consisting of:
    (1) a first transparent substrate,
    (2) a first linear polarizer sheet being of substantially the same size as said first transparent substrate and attached to the inward side of said substrate, said sheet having a plurality of longitudinally abutting and alternating linear polarizing segments A and B, where the polarized direction of segments A is orthogonal to the polarized direction of segments B,
  b) a second periodic polarizing pane substantially identical to said first periodic polarizing pane, having a second transparent substrate and a second linear polarizer sheet,
B. means for enclosing said multi-layer pane assembly,
C. means for allowing said first or second pane to move parallel and relative to the other in a direction where said means comprises an actuator coupled to said second periodic polarizer sheet to translate it between the OPEN and OPAQUE alignment positions, or to a SLATTED position that lies between the CLOSED and OPAQUE positions, said actuator further comprising:
  a) an electromechanical circuit further comprising:
    (1) a motor attached directly to said actuator,
    (2) a power source that controls the power applied to the motor,
    (3) an infrared receiver that when activated, energizes the power source, and
    (4) an infrared transmitter that when activated produces an infrared signal that activates the infrared receiver, where the transmitter can be an infrared television remote control that produces the required infrared signal when any of its buttons are pressed,
  b) a rotatable shaft,
  c) a spring that bias said second periodic polarizer sheet in the OPAQUE alignment position,
  d) a spring that bias said second periodic polarizer sheet in the CLOSED alignment position, and
  e) a ratchet for constraining the rotatable shaft to turn in only one direction where
    (1) when segments A and B on said first pane are superimposed with corresponding identically polarized segments A and B on said second pane an OPEN alignment is produced that allows light to pass through said assembly,
    (2) when segments A and B on said first pane are superimposed with corresponding orthogonally polarized segments B and A on said second pane an OPAQUE alignment is produced that prevents light from passing through said assembly, and
    (3) when segments A and B are placed in an overlapping position between the OPEN and OPAQUE positions, a SLATTED alignment is produced that allows some light to pass through said assembly.

8. A method of producing a transmittance-adjustable window comprising the steps of:

A forming a first periodic polarizing pane comprising the steps of:
   a) providing a first transparent substrate,
   b) providing a plurality of linear polarizing segments A, each having a width a,
   c) affixing said polarizing segments A in a spaced alignment on said first transparent substrate with a spacing of width a between adjacent segments A,
   d) providing a plurality of linear polarizing segments B, each having a width a and a polarized direction that is orthogonal to the polarized direction of segments A, B. forming a second periodic polarizing pane that is substantially identical to said first periodic polarizing pane, and C. disposing said second polarizing pane for relative translation parallel to said first polarizing pane between:
   a) an OPEN alignment in which polarizing segments A and B on said first polarizing pane are superimposed with identically corresponding polarizing segments A and B on said second polarizing pane, where the OPEN position allows light to pass through said first and second polarizing panes, and
   b) an OPAQUE alignment in which segments A and B on said first polarizing pane are superimposed with the corresponding orthogonally polarizing segments B and A on said second polarizing pane, where the OPAQUE position prevents light from passing through said first and second polarizing panels.

9. The method as specified in claim 8 wherein the segments A and B lie in a common plane and have a common shape.

10. The method as specified in claim 8 wherein said polarizer sheet is substantially rectangular and of dimension H in a first direction and of an equal or smaller dimension L in a second direction, and where each polarizer segment A and B has a width a that lies between H/2 to H/n, where n may be any integer, is substantially parallel to the first direction H and has a length approximately L in a longitudinal direction substantially parallel to the second direction L.

11. The method as specified in claim 8 further providing a transparent cover sheet and sandwiching the linear polarizing segments A and B between the transparent cover sheet and the transparent substrate.

12. The method as specified in claim 8 wherein all the polarizing segments B are integrally formed as a template from a sheet of linear polarized material, where the template forms a slot between each of the polarizing segments B into which a corresponding one of the polarizing segments A is tightly fitted.

13. The method as specified in claim 8 further providing a pane moving means for disposing said second polarizing pane for relative translation parallel to said first polarizing pane.

14. The method as specified in claim 8 wherein said polarizer sheet is substantially rectangular and of dimension H in a first direction and of an equal or greater dimension L in a second direction, and where each polarizer segment A and B has a width a that lies between H/2 to H/n, where n may be any integer, is substantially parallel to the first direction H and has a length approximately L in a longitudinal direction substantially parallel to the second direction L.

* * * * *